United States Patent [19]
Edlund et al.

[11] Patent Number: 6,085,227
[45] Date of Patent: Jul. 4, 2000

[54] SYSTEM AND METHOD FOR OPERATING SCIENTIFIC INSTRUMENTS OVER WIDE AREA NETWORKS

[75] Inventors: Stefan B. Edlund; Matthias Eichstaedt, both of San Jose; Donald Mark Eigler, Santa Cruz; Reiner Kraft, Gilroy, all of Calif.

[73] Assignee: International Business Machines Corporation, Armonk, N.Y.

[21] Appl. No.: 09/045,140

[22] Filed: Mar. 20, 1998

[51] Int. Cl.[7] .............................. G06F 13/38; G06F 15/17
[52] U.S. Cl. ......................... 709/203; 709/205; 709/208; 709/217; 709/225; 709/228; 345/329; 345/331; 395/80; 705/27; 380/25; 364/200
[58] Field of Search .................................. 709/203, 233, 709/208, 209, 217, 227, 225, 228; 340/825.05; 348/565; 345/329, 331; 364/200, 495; 395/80; 380/25; 370/401; 705/27

[56] References Cited

U.S. PATENT DOCUMENTS

| | | | |
|---|---|---|---|
| 4,982,324 | 1/1991 | McConaughy et al. | 364/200 |
| 4,994,788 | 2/1991 | Philippe et al. | 340/505 |
| 5,220,380 | 6/1993 | Hirata et al. | 355/204 |
| 5,315,711 | 5/1994 | Barone et al. | 395/275 |
| 5,539,479 | 7/1996 | Bertram . | |
| 5,602,597 | 2/1997 | Bertram . | |
| 5,606,374 | 2/1997 | Bertram . | |
| 5,761,071 | 6/1998 | Bernstein et al. . | |
| 5,781,550 | 7/1998 | Templin et al. . | |
| 5,791,992 | 8/1998 | Crump et al. | 463/31 |
| 5,802,518 | 9/1998 | Karaev et al. . | |
| 5,805,812 | 9/1998 | Fish et al. | 709/208 |
| 5,826,122 | 10/1998 | Shekel . | |
| 5,838,906 | 11/1998 | Doyle et al. . | |
| 5,838,910 | 11/1998 | Domenikos et al. . | |
| 5,841,975 | 11/1998 | Layne | 709/203 |
| 5,870,301 | 2/1999 | Yakushiji et al. | 364/132 |
| 5,898,780 | 4/1999 | Lie et al. | 380/25 |
| 5,898,835 | 4/1999 | Truong | 709/217 |
| 5,911,582 | 6/1999 | Redford et al. | 434/307 |
| 5,930,768 | 6/1999 | Hooban | 705/27 |
| 5,933,355 | 8/1999 | Deb | 364/483 |
| 5,978,850 | 11/1999 | Ramachandran | 709/228 |
| 6,018,567 | 1/2000 | Dunman | 379/34 |
| 6,018,587 | 1/2000 | Cabib | 382/165 |

FOREIGN PATENT DOCUMENTS 300368  3/1997  Taiwan .

OTHER PUBLICATIONS

Beyond trhe Web: Excavating the real world via mosaic, Goldberg et al., http://WWW.usc.edu/dept/raiders/paper/, 18 pages, Oct. 17, 1994.

The Telegarden, Goldberg et al.,http://telegarden.aec.at/, 2 paegs, Jun. 1995.

About Telegarden, Goldberg et al.,http://telegarden.aec.at/html/intro.html? 3 pages, Aug. 1995.

IBM Technical Disclosure Bulletin, vol. 38, No. 1, Jan. 1995, "Distributed object Encapsulation of Customer Information Control System Distributed Transaction Processing", pp. 177–180.

IBM Technical Disclosure Bulletin, vol. 38, No. 9, Sep. 1995, "MPEG Menu Manager", pp. 291–295.

*Primary Examiner*—Frank J. Asta
*Assistant Examiner*—Bunjob Jaroenchonwanit
*Attorney, Agent, or Firm*—Gates & Cooper

[57] ABSTRACT

A method, apparatus, and article of manufacture for operating remote devices over wide area networks such as the Internet. The system includes client computers for interacting with users to accept commands and display results, a proxy server computer for performing intermediate processing of commands and results, and a device server computer coupled to the remote device that executes the commands and generates the results.

24 Claims, 4 Drawing Sheets

SYSTEM AND METHOD FOR OPERATING SCIENTIFIC INSTRUMENTS OVER WIDE AREA NETWORKS

BACKGROUND OF THE INVENTION

1. Field of the Invention

The present invention generally relates to applications involving the Internet, and in particular, to a system and method for operating scientific instruments over wide area networks such as the Internet.

2. Description of Related Art

Access to sophisticated scientific instruments is often difficult and problematic for most researchers. Usually, only wealthy organizations can afford such instruments, making it difficult for researchers at smaller or less well off organizations to perform necessary experiments. Educational institutions especially can rarely afford all the equipment needed to provide adequate scientific training. In addition, there are often only one or few such instruments available in a geographic area, or the world at large, requiring researchers to travel in order to use the instruments. As a result, such instruments may not be used effectively or continuously.

The advent of the Internet holds the promise for resolving these and other problems. More specifically, the present invention solves these problems by providing real-time access to remote devices, such as scientific instruments, using the Internet.

SUMMARY OF THE INVENTION

To overcome the limitations in the prior art described above, and to overcome other limitations that will become apparent upon reading and understanding the present specification, the present invention discloses a method, apparatus, and article of manufacture for operating remote devices over wide area networks such as the Internet. It is an object of the present invention to allow any user on the Internet, who has sufficient access privileges, to execute commands on a remote device in real-time. It is another object of the present invention to make the results of the operation of the remote device available to any number of observers via a broadcast function across the Internet.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention, known as Web Scope (WS), provides a system and method for operating remote devices over wide area networks such as the Internet. In a preferred embodiment, the Web Scope is used to provide real-time access to sophisticated scientific instruments that are able to execute commands on the behalf of remotely located users.

The Web Scope is different from existing analytic devices in two important areas. First, the Web Scope allows any user on the Internet, who has been given sufficient access permissions, to conduct experiments in real-time. Using the Web Scope, the user simply issues commands to the scientific instrument to perform certain operations, and then receives results from each operation.

Depending on the nature of the instrument, the command set of the Web Scope may vary widely. For example, a network-attached scanning tunneling microscope (STM) may be able to scan the surface of a sample and may be able to move atoms on a surface in response to the commands of remote users. In this example, users can issue commands to the STM to manipulate the sample in real-time and respond back with images of the manipulated sample.

Second, the operation of the scientific instrument can be made available to a large, heterogeneous user community via a broadcast function across the Internet. As a result, any user on the Internet with "view" permissions is able to observe the operation of the scientific instrument and the progress of an experiment. This broadcast facility may be used for scientific as well as educational purposes.

Such real-time access to remote devices over the Internet, especially sophisticated and costly scientific instruments, has the potential of making a major impact on the uses and applications of scientific instruments. In addition, the present invention provides the Internet with more dynamic applications, e.g., live content resulting from real-time experiments with the scientific instruments.

Hardware Environment

Figure 1:
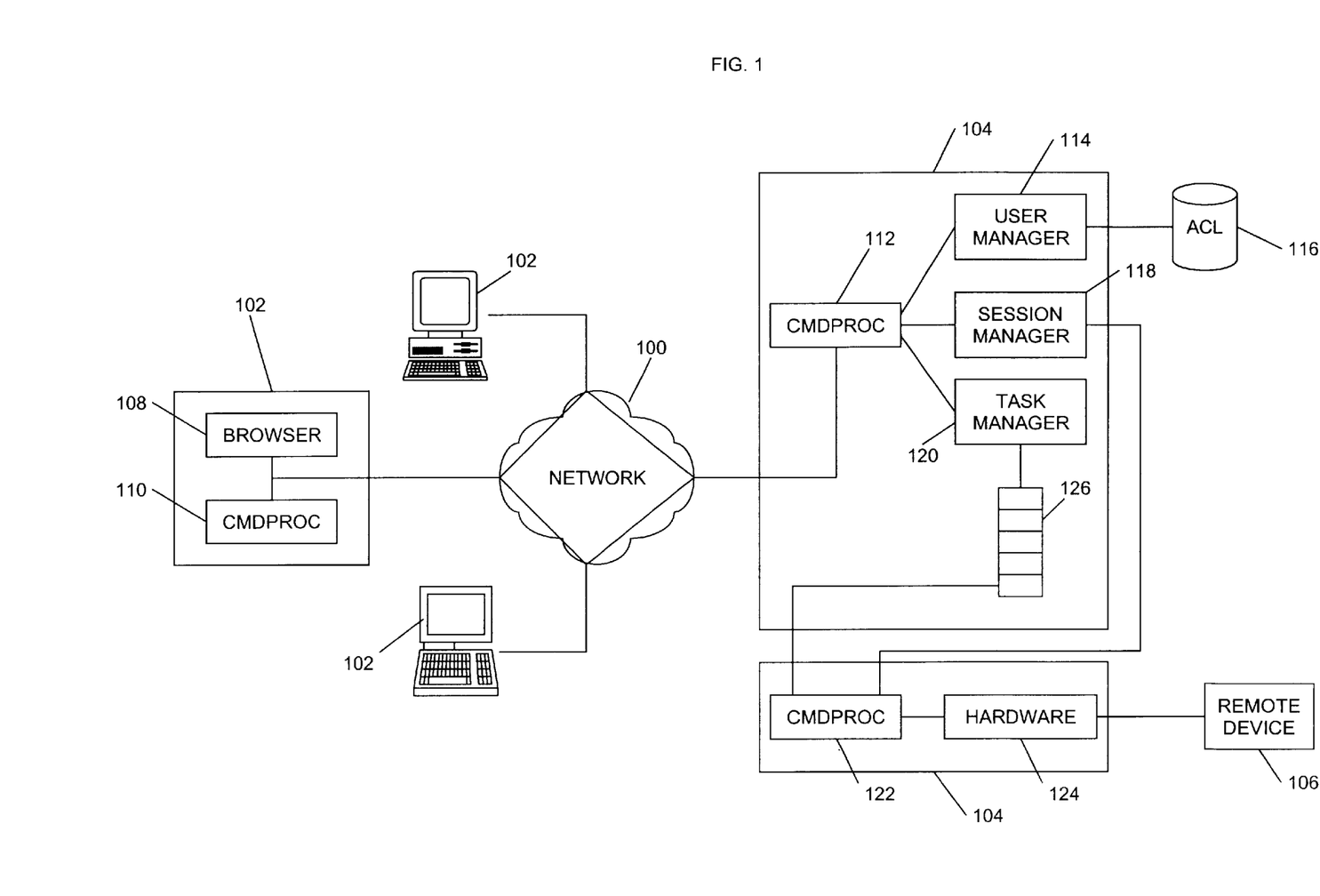
FIG. 1 is an exemplary hardware environment used to implement the preferred embodiment of the invention.

FIG. 1 schematically illustrates an exemplary hardware environment used in the preferred embodiment of the present invention. The present invention is implemented using a network 100 to connect one or more client computers 102 to one or more server computers 104. In this embodiment, one of the server computers 104 comprises a proxy server computer 104 that provides intermediate processing of commands for the remote device 106, and another of the server computers 104 comprises a device server computer 104 that actually controls the remote device 106. A typical combination of resources may include client computers 102 that comprise personal computers or workstations, and server computers 104 that comprise personal computers, workstations, minicomputers, or mainframes. The network 100 connecting these computers may comprise a LAN, WAN, Internet, etc.

Generally, the present invention is implemented using one or more computer programs that are executed by the client computers 102 and/or server computers 104. In the exemplary embodiment of FIG. 1, these computer programs include: (1) a browser program 108 and client command processor 110 that are executed by the client computers 102; (2) a proxy command processor program 112, a user manager program 114 including an access control list (ACL) 116, a session manager program 118, and a task manager program 120 executed by a proxy server computer 104; and (3) a device command processor program 122 and hardware interface program 124 executed by a device server computer 104.

Each of the computer programs comprise instructions which, when read and executed by their respective computers, cause the computers to perform the steps or elements of the present invention. The computer programs are usually embodied in or readable from a computer-readable device, medium, or carrier, e. g., a local or remote data storage device or memory device coupled to the computer directly or coupled to the computer via a data communications device.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier or product") as used herein is intended to encompass one or more computer programs accessible from any device, medium, or carrier.

Of course, those skilled in the art will recognize that the exemplary environment illustrated in FIG. 1 is not intended to limit the present invention. For example, the functions of the proxy server computer 104 and device server computer 104 could be performed by a single server computer 104. Moreover, a client/server architecture is not required, and the present invention could be completly implemented on a single computer, such as a workstation. Indeed, those skilled in the art will recognize that other alternative hardware environments may be used without departing from the scope of the present invention.

Operation of the Web Scope

The Web Scope uses a number of novel components in its operations. These components include a user interface, command processors, a user manager, a session manager, and a task manager.

User Interface

The user interface provided by the browser 108 and client command processor 110 allows an individual user to operate and view the current status of the remote device 106. Typically, such an interface is specific to a particular device 106 or instrument, which may comprise a scanning tunneling microscope, a telescope, a robot in a remote location, or other remotely-located device. Essentially, this interface reflects the status of a live experiment and can be invoked by multiple users simultaneously at multiple client computers 102.

In the preferred embodiment, the user interface comprises a graphical user interface (GUI) that provides graphical images for both controlling the remote device 106 and viewing the results of the remote device 106. In addition, audio or other multimedia elements could be used to enhance the user's experience.

Generally, there are two key elements a user can control in this interface: (1) device specific parameters and (2) device operation. With regard to device specific parameters, the state of the remote device 106 and its software can be said to be defined by a set of parameters at any moment in time. These parameters are usually data objects such as numbers, strings, Boolean variables, arrays, etc.

Note that the possible parameters are determined by application needs and characteristics of the remote device 106. For example, if the remote device 106 comprises a scanning tunneling microscope, then, depending on the application, a sample can be analyzed by the scanning tunneling microscope using a variety of parameters. Most device specific parameters are of static nature and do not change frequently. However, a user may need to view a wide variety of dynamic parameters in different representations and may need to manipulate such parameters in order to conduct experiments.

With regard to device 106 operation, the user interface allows users to operate the remote device 106 in real-time. During such operation, commands sent to the device 106 may be acknowledged with status and result information. For example, if a user has control over the tip of a scanning tunneling microscope, the movement of a mouse input device with the user interface may directly control the movement of the tip in the microscope, which in turn directly affects the sample. In addition, information may be transmitted back to the user interface to indicate the results of the operation, for example, indicating if the atom has followed the movement of the mouse. Moreover, the user interface for the above example could include an image display that shows the current structure of the sample and a mouse pointer could be used to interact with elements of the image display and the results are reflected in the image display. It is also envisioned that the user interface would include other multimedia elements, such as audio, that would enhance the observations of the remote device 106.

Command Processors

The command processors 110, 112, and 122 are distributed components that facilitate the transmission of commands from the user to the remote device 106 and the transmission of a cohesive stream of result and status information from the remote device 106 to the user. The command processors 110, 112, and 122 basically operate on all three levels of the architecture, i.e., the client computers 102, the proxy server computer 104, and the device server computer 104.

Typically, commands are processed on an intermediate machine, i.e., the proxy server computer 104, to accommodate specific features of the remote device 106. There are a rich set of strategies available to process commands, such as translating complex commands into a sequence of basic instructions or mapping to different coordinate systems.

One important feature of the command processors 110, 112, and 122 is that each command results in feedback to the users. For example, when the device 106 is a scanning tunneling microscope, the transmission from the user interface of an atom movement command ultimately results in the receipt of an acknowledgement at the user interface indicating whether the atom was moved by the device 106 or not. Moreover, the current state of the device 106 can be monitored by multiple users simultaneously.

User Manager

The user manager 114 of the present invention provides for access control to the remote device 106. Naturally, a large number of users on the Internet may be interested in operating the remote device 106. In order to issue commands in a controlled manner, each user and/or command may have an access control list (ACL) 116 associated therewith. The user manager 114 grants or denies permissions to commands issued by individual users or groups of users in accordance with the ACL 116. Of course, the nature of the remote device 106 may limit the number of users that are able to control the remote device 106 at any point in time (typically only one user at a time can issue commands to the remote device 106), although any number of users may be able to observe the results and status information from the device 106.

Session Manager

The session manager 118 ensures that not more than a maximum number of users gains control over the remote device 106; limits can be set on the number of observing users as well. The session manager 118 also terminates user sessions when the time period assigned to a user has been exceeded. Furthermore, the session manager 118 also makes sure that updated results and status information regarding the remote device 106 are dispatched to all users who are currently observing the operation of the remote device 106. Limited only by the bandwidth of the Internet connection, such observers would be able to study the operation or progress of the remote device 108 in real-time or substantially close to real-time.

Task Manager

When a command from the user is authorized by the user manager 114 and session manager 118 on the proxy server computer 104, the task manager 120 is then invoked. The task manager 120 may translate the command into one or more device 106 dependent sub-commands.

In addition, the task manager 120 stores these commands or sub-commands in a priority queue 126. The priority queue 126 is a temporary data structure for queuing commands before they reach the remote device 106 to ensure that a slow device 106 does not get overloaded with too many commands. By adding priorities to such a queue 126, it is possible for a "super user" to take over control of the device 106 at anytime.

The command processor 122 on the device server computer 104 polls the queue 126 for input, and receives one command at a time and sends it to the device 106 via the hardware interface 124 for execution. Results and status information from the remote device 106 are sent back to the session manager 118 on the proxy server computer 104 by the command processor 122, which ensures that the results and status information are broadcast to all observing users. A time-out mechanism maintained by the session manager 118 on the proxy server computer 104 guarantees that the users are informed when the remote device 106 fails to respond.

Logic of the Web Scope

Figure 2:
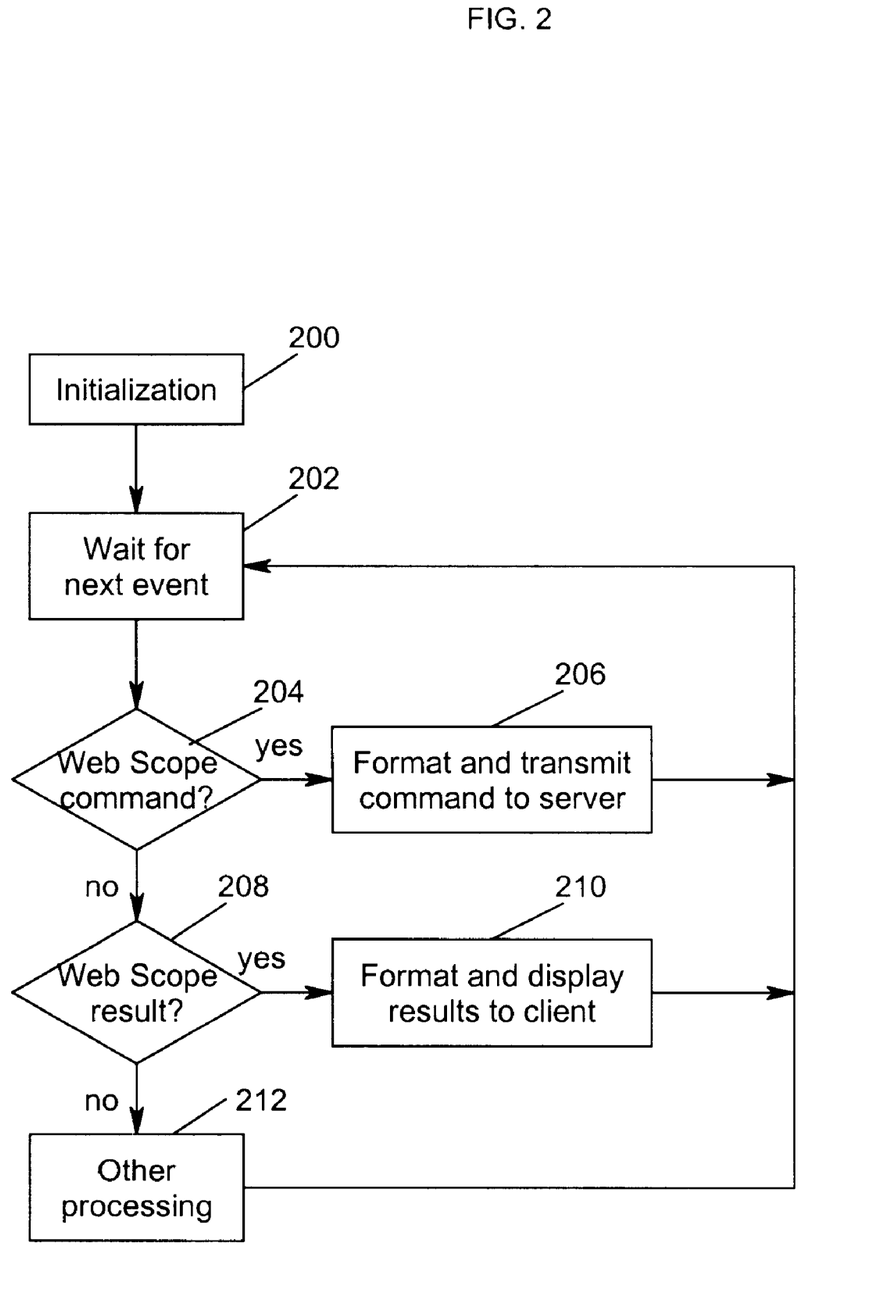
FIG. 2 is a flowchart that illustrates the general logic of a client computer performing the steps of the present invention.
Figure 3:
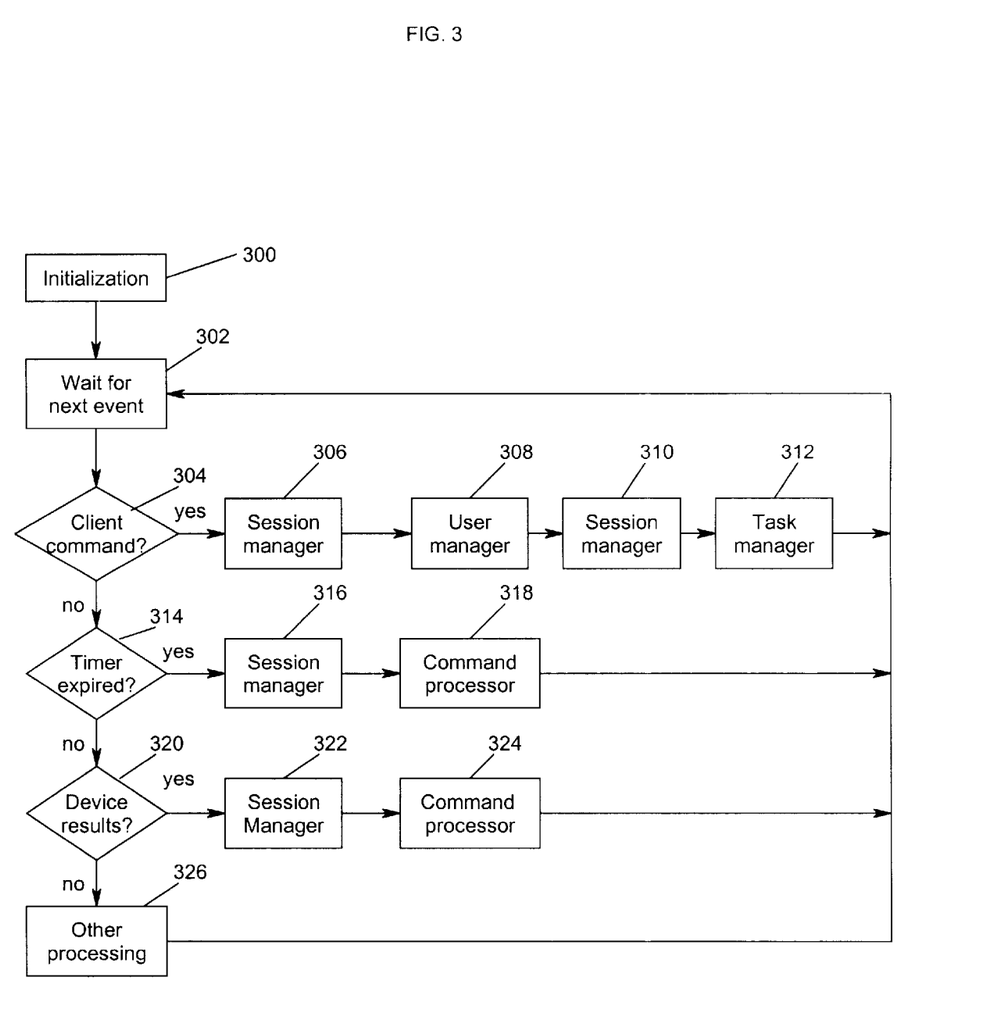
FIG. 3 is a flowchart that illustrates the general logic of a proxy server computer performing the steps of the present invention.
Figure 4:
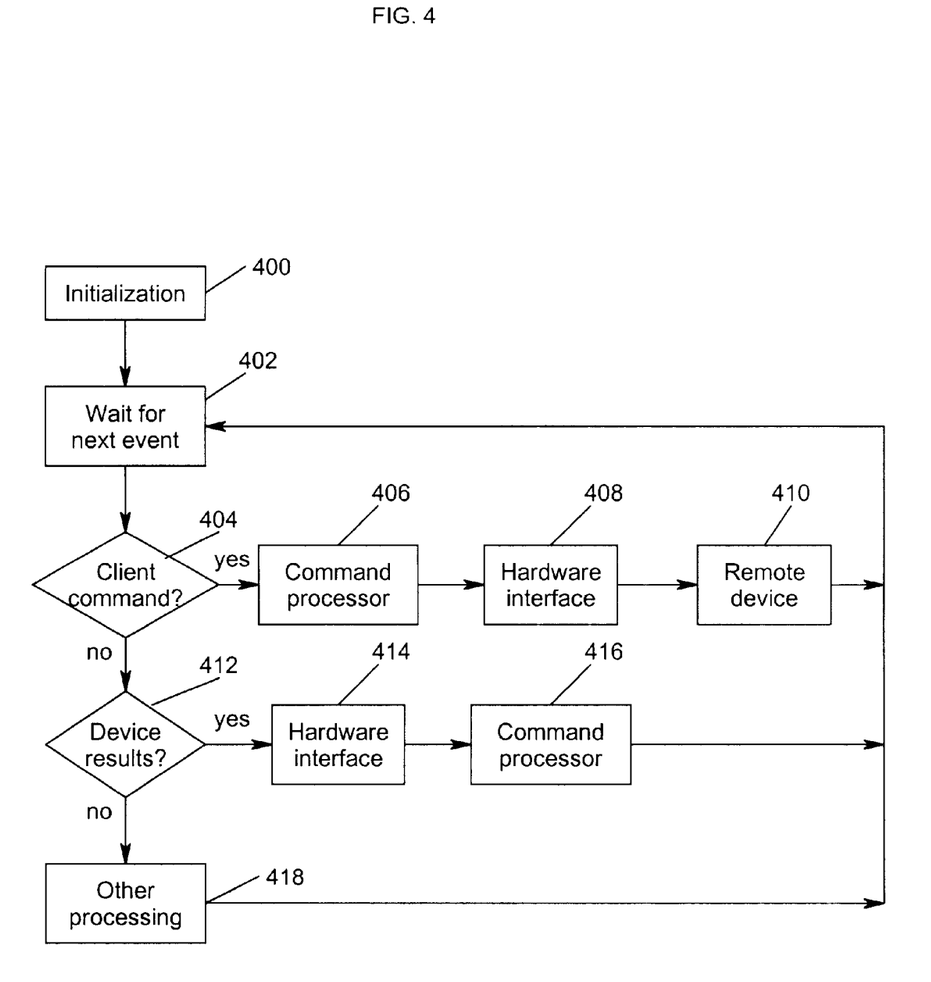
FIG. 4 is a flowchart that illustrates the general logic of a device server computer performing the steps of the present invention.

Flowcharts that illustrate the logic of the Web Scope of the present invention are shown in FIGS. 2, 3 and 4. Those skilled in the art will recognize that this logic is provided for illustrative purposes only and that different logic may be used to accomplish the same results.

Client Computer

FIG. 2 is a flowchart that illustrates the general logic of the client computer 102 when performing the steps of the present invention.

Block 200 represents the client computer 102 initializing the browser 108 and command processor 110. The browser 108 and command processor 110 are used to interact with the user on the client computer 102. Such interaction may include, inter alia, accessing servers and pages on the Internet, including the proxy server computer 104 and the device server computer 104.

Block 202 represents the client computer 102 waiting for the next event to occur, i.e., waiting for the next input from the user and/or the server computers 104 connected via the Internet.

Block 204 is a decision block that represents the client computer 102 determining whether the event comprises the receipt of a Web Scope command invoked by the user via the browser 108. If so, control transfers to block 206; otherwise, control transfers to block 208.

Block 206 represents the command processor 110 analyzing the interactions between the browser 108 and the user, formatting a command for the remote device 106, and then transmitting the command for the remote device 106 to the proxy server computer 104. Thereafter, control transfers to Block 202.

Block 208 is a decision block that represents the client computer 102 determining whether the event comprises the receipt of results and status information from the proxy server computer 104. If so, control transfers to block 210; otherwise, control transfers to block 212.

Block 210 represents the command processor 110 analyzing the results and status information received from the proxy server computer 104 regarding the remote device 106, formatting the information, and then providing the formatted information to the browser 108 for display to the user on the client computer 102. Thereafter, control transfers to Block 202.

Block 212 represents the client computer 102 performing other processing. Thereafter, control transfers to Block 202.

Proxy Server Computer

FIG. 3 is a flowchart that illustrates the general logic of the proxy server computer 104 when performing the steps of the present invention.

Block 300 represents the proxy server computer 104 initializing the command processor 112, user manager 114, session manager 118, and task manager 120.

Block 302 represents the proxy server computer 104 waiting for the next event to occur, i.e., waiting for the next input from the client computer 102 and/or the device server computer 104.

Block 304 is a decision block that represents the proxy server computer 104 determining whether the event comprises the receipt of a command from the client computer 102. If so, control transfers to block 306; otherwise, control transfers to block 312.

Block 306 represents the command processor 112 on the proxy server computer 104 transmitting the command received from the client computer 102 to the user manager 114.

Block 308 represents the user manager 114 on the proxy server computer 104 analyzing the commands in light of its access control list 116, and determining whether to grant or deny permission to the user's commands based on that analysis.

Block 310 represents the session manager 118 on the proxy server computer 104 receiving the permission information from the user manager 114 and ensuring that the received commands can proceed based on, inter alia, whether the user is requesting control of the remote device 106, whether the user is requesting to observe the operation of the remote device 106, etc. Further, when the user has control of the remote device 106, the session manager 118 terminates user sessions that exceed their allotted time period.

Block 312 represents the task manager 120 on the proxy server computer 104 receiving the permission and authorization information from the user manager 114 and session manager 118, and then queuing the commands in the priority queue 126 for subsequent access by the command processor 122 on the device server computer 104. Thereafter, control transfers to Block 302.

Block 314 is a decision block that represents the proxy server computer 104 determining whether the event is the expiration of a timer associated with a user session. If so, control transfers to block 316; otherwise, control transfers to block 320.

Block 316 represents the session manager 118 analyzing the timer expiration, and then determining what actions should be taken, e.g., which users should be notified of the expiration.

Block 318 represents the command processor 112 on the proxy server computer 104 receiving the timer expiration information from the session manager 118, and then distributing the information to one or more client computers 102 and their users. Thereafter, control transfers to Block 302.

Block 320 is a decision block that represents the proxy server computer 104 determining whether the event comprises the receipt of results and status information from the command processor 122 on the device server computer 104. If so, control transfers to block 322; otherwise, control transfers to block 326.

Block 322 represents the session manager 118 on the proxy server computer 104 receiving the results and status information from the command manager 122 on the device server computer 104 and determining how to distribute such information to one or more client computers 102 and their users.

Block 324 represents the command processor 112 on the proxy server computer 104 receiving the results and status information from the session manager 118, and then distributing the information to one or more client computers 102 and their users. Thereafter, control transfers to Block 302.

Block 326 represents the proxy server computer 104 performing other processing. Thereafter, control transfers to Block 302.

Device Server Computer

FIG. 4 is a flowchart that illustrates the general logic of the device server computer 104 when performing the steps of the present invention.

Block 400 represents the device server computer 104 initializing the command processor 122 and hardware interface 124 for the remote device 106.

Block 402 represents the device server computer 104 waiting for the next event to occur, i.e., waiting for the next input from the proxy server computer 104 and/or the remote device 106.

Block 404 is a decision block that represents the device server computer 104 determining whether the event comprises the receipt of a command from the priority queue 126 on the proxy server computer 104. If so, control transfers to block 406; otherwise, control transfers to block 412.

Block 406 represents the command processor 122 on the device server computer 104 transmitting the command to the hardware interface 124 for subsequent execution by the remote device 106 itself.

Block 408 represents the hardware interface 408 on the device server computer 104 formatting the commands for the remote device 106, and transmitting the formatted commands to the remote device 106.

Block 410 represents the remote device 106 coupled to the device server computer 104 executing the commands. Thereafter, control transfers to Block 402.

Block 412 is a decision block that represents the device server computer 104 determining whether the event comprises the receipt of results and status information from the remote device 106. If so, control transfers to block 414; otherwise, control transfers to block 418.

Block 414 represents the hardware interface 124 on the device server computer 104 receiving the results and status information from the remote device 106, and then transmitting the information to the command processor 122.

Block 416 represents the command processor 122 on the device server computer 104 receiving the results and status information from the hardware interface 124, and then transmitting the information to the session manager 118 on the proxy server computer 104 for subsequent distribution to one or more client computers 102 and their users. Thereafter, control transfers to Block 402.

Block 418 represents the device server computer 104 performing other processing. Thereafter, control transfers to Block 402.

Conclusion

This concludes the description of the preferred embodiment of the invention. The following describes some alternative embodiments for accomplishing the present invention.

For example, any type of remote device could be used with the present invention. In addition, any type of computer configuration and/or network configuration could benefit from the present invention.

Those skilled in the art will recognize that real-time display of information may be augmented by the display of pre-recorded information. Indeed, it is anticipated that user interaction with the remote device 106, as well as results and status information from the remote device 106, would be recorded for later perusal.

In summary, the present invention discloses a system for operating remote devices over wide area networks such as the Internet. The system includes client computers for interacting with users to accept commands and display results, a proxy server computer for performing intermediate processing of commands and results, and a device server computer coupled to the remote device that executes the commands and generates the results.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for operating a remote device over a network, comprising:
  (a) one or more client computers capable of simultaneously controlling the remote device, the one or more client computers configured to:
    interact with one or more users to:
      obtain one or more parameters that define a state of the remote device; and
      issue commands for the operation of the remote device; and
    receive results from the remote device;
  (b) a proxy server computer capable of permitting simultaneous control of the remote device by the one or more client computers, and wherein the proxy server computer is coupled to the client computers and the proxy server computer is configured to:
    receive the issued commands from the client computers;
    translate the issued commands;
    determine whether the translated commands can be executed;
    queue the translated commands for the remote device until they can be executed;

transform results and status information received from the remote device into a form suitable for the client computer; and transmit the transformed results and status information to all of the client computers configured to receive results without obtaining further user input requesting the results; and (c) a device server computer, coupled to the proxy server computer and the remote device, the device server computer configured to:

retrieve the queued commands from the proxy server computer;

operate the remote device in accordance with retrieved commands; and provide results and status information received from the remote device to the proxy server computer.

2. The system of claim 1, wherein the proxy server computer is coupled to client computers over the Internet.

3. The system of claim 1, wherein the remote device is a scientific instrument.

4. The system of claim 3, wherein the issued commands comprise an experiment using the scientific instrument.

5. The system of claim 1, wherein the proxy server computer determines whether a user has sufficient access permissions for the issued commands.

6. The system of claim 1, wherein the proxy server computer is further configured to transmit the results from the remote device to a large, heterogeneous user community via a broadcast function to all of the client computers.

7. The system of claim 1, wherein the client computers are further configured to execute a browser and a client command processor that allows a user to operate the remote device and observe the results from the remote device.

8. The system of claim 1, wherein the client computers, proxy server computer, and device server computer are further configured to execute a command processor that facilitates the transmission of commands from the client computers to the remote device and results from the remote device to the client computers.

9. The system of claim 1, wherein the proxy server computer includes a user manager for managing a collection of users and access permissions for the commands.

10. The system of claim 9, wherein the user manager includes an access control list for each command and the user manager grants and denies permission to execute the issued commands in accordance with the access control list.

11. The system of claim 1, further comprising a maximum number of users and wherein the proxy server computer includes a session manager for ensuring that not more than the maximum number of users gains control over the remote device.

12. The system of claim 1, further comprising a maximum number of users and wherein the proxy server computer includes a session manager for ensuring that not more than the maximum number of users receives the results and status information from the remote device.

13. The system of claim 1, wherein the proxy server computer includes a session manager for terminating a user's session operating the remote device when a time period has been exceeded.

14. The system of claim 1, wherein the proxy server computer includes a session manager for ensuring that the results received from the remote device are dispatched to all of the users observing the operations of the remote device.

15. The system of claim 1, wherein the proxy server computer includes a task manager for processing the issued commands and for storing the commands in a priority queue.

16. The system of claim 15, wherein the priority queue is a temporary data structure for queuing the issued commands before they reach the remote device.

17. The system of claim 16, wherein the priority queue allows a "super user" to take control of the remote device.

18. The system of claim 15, wherein the device server computer includes a command processor for polling the priority queue, for retrieving one or more commands at a time from the polled priority queue, for transmitting the retrieved commands to the remote device for execution, and for transmitting results from the remote device to the proxy server computer for distribution to the client computers.

19. The system of claim 18, wherein the command processor transmits results from the commands to a session manager on the proxy server computer, and the session manager ensures that the results are broadcast to all observing users.

20. A method for operating a remote device over a network, comprising:

(a) interacting with one or more users via one or more client computers to obtain one or more parameters that define a state of the remote device and issue commands for the operation of the remote device and to receive results from the remote device, the one or more client computers capable of simultaneously controlling the remote device;

(b) receiving the issued commands from the client computers at a proxy server computer, translating the issued commands, determining whether the translated commands can be executed, queuing the translated commands for the remote device until they can be executed, transforming results and status information received from the remote device into a form suitable for the client computer, and transmitting the transformed results and status information from the proxy server computer to all of the client computers without obtaining further user input requesting the results; and (c) retrieving the queued commands from the proxy server computer to a device server computer coupled to the remote device, operating the remote device in accordance with retrieved commands, and providing results and status information received from the remote device to the proxy server computer.

21. An article of manufacture comprising a computer program carrier readable by a computer and embodying one or more instructions executable by the computer to perform method steps for operating a remote device over a network, the method comprising:

(a) interacting with one or more users via one or more client computers to obtain one or more parameters that define a state of the remote device and to issue commands for the operation of the remote device and to receive results from the remote device, the one or more client computers capable of simultaneously controlling the remote device;

(b) receiving the issued commands from the client computers at a proxy server computer, translating the issued commands, determining whether the translated commands can be executed, queuing the translated commands for the remote device until they can be executed, transforming results and status information received from the remote device into a form suitable for the client computer, and transmitting the transformed results and status information from the proxy server computer to all of the client computers without obtaining further user input requesting the results; and (c) retrieving the queued commands from the proxy server computer to a device server computer coupled to the remote device, operating the remote device in accordance with retrieved commands, and providing results and status information received from the remote device to the proxy server computer.

22. A system for operating a remote device over a network, wherein one or more users are capable of simultaneously controlling the remote device, the system comprising:

means for interacting with one or more users to issue commands for the operation of the remote device;

means for interacting with the one or more users to obtain one or more parameters that define a state of the remote device;

means for determining whether the commands can be executed with the one or more parameters;

means for optionally translating the commands into a form suitable for the remote device, means for optionally queuing the commands until they can be executed by the remote device;

means for operating the remote device in accordance with the commands;

means for gathering results and status information from the remote device;

means for formatting the results and status information; and means for providing the results and status information to all of the users without obtaining further user input requesting the results.

23. A method for operating a remote device over a network, wherein one or more users are capable of simultaneously controlling the remote device; the method comprising:

interacting with one or more users to issue commands for the operation of the remote device;

interacting with one or more users to obtain one or more parameters that define a state of the remote device;

determining whether the commands can be executed;

optionally translating the commands into a form suitable for the remote device, optionally queuing the commands until they can be executed by the remote device;

operating the remote device in accordance with the commands;

gathering results and status information from the remote device;

formatting the results and status information; and providing the results and status information to all of the users without obtaining further user input requesting the results.

24. An article of manufacture comprising a computer program carrier readable by a computer and embodying one or more instructions executable by the computer to perform method steps for operating a remote device over a network, wherein one or more users are capable of simultaneously controlling the remote device, the method comprising:

interacting with one or more users to issue commands for the operation of the remote device;

interacting with the one or more users to obtain one or more parameters that define a state of the remote device;

determining whether the commands can be executed;

optionally translating the commands into a form suitable for the remote device, optionally queuing the commands until they can be executed by the remote device;

operating the remote device in accordance with commands;

gathering results and status information from the remote device;

formatting the results and status information; and providing the results and status information to all of the users without obtaining further user input requesting the results.

* * * * *